(12) United States Patent
Leung

(10) Patent No.: US 6,519,705 B1
(45) Date of Patent: Feb. 11, 2003

(54) METHOD AND SYSTEM FOR POWER CONTROL IN WIRELESS NETWORKS USING INTERFERENCE PREDICTION WITH AN ERROR MARGIN

(75) Inventor: Kin K. Leung, Middlesex County, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/460,993

(22) Filed: Dec. 15, 1999

(51) Int. Cl.$^7$ .................................................. G06F 1/26
(52) U.S. Cl. ...................................... 713/300; 713/340
(58) Field of Search ................................ 713/300, 310, 713/320, 340

(56) References Cited

U.S. PATENT DOCUMENTS

| | | | | |
|---|---|---|---|---|
| 6,097,947 A | * | 8/2000 | Takai | 455/424 |
| 6,101,176 A | * | 8/2000 | Honkasalo et al. | 370/335 |
| 6,122,260 A | * | 9/2000 | Liu et al. | 370/280 |
| 6,363,252 B1 | * | 3/2002 | Hamalainen et al. | 455/436 |

OTHER PUBLICATIONS

S.A. Grandhi, R. Vijayan, D.J. Goodman and J. Zander, "Centralized Power Control in Cellular Radio System", IEEE *Trans. on Veh. Tech.*, vol. 42, No. 4, Nov. 1993, pp. 466–468.

L. Wang and K. K. Leung, "A High–Capacity Cellular System with Improved Sectorization and Interleaved Channel Assignment," *Multiaccess, Mobility and Teletraffic (MMT'98) for Wireless Communications*: vol. 3, Kluwer Academic Publishers, 1998, pp. 43–58.

* cited by examiner

*Primary Examiner*—Dennis M. Butler
(74) *Attorney, Agent, or Firm*—Oliff & Berridge, PLC

(57) ABSTRACT

An enhanced power control method for use in a wireless packet-switched network having an interference prediction algorithm which includes an error margin. In particular, the method can measure an interference power and a path gain between an intended receiver and transmitter. Based upon the past performance of the network, a future interference value may be predicted by using a prediction algorithm. Furthermore, based upon the prior accuracy of the interference prediction, the method can also estimate an error margin for the interference prediction. Finally, a transmission power for the transmitter can be calculated using the predicted interference power, the estimated error margin for the predicted interference power, the path gain, and the target SINR.

23 Claims, 8 Drawing Sheets

METHOD AND SYSTEM FOR POWER CONTROL IN WIRELESS NETWORKS USING INTERFERENCE PREDICTION WITH AN ERROR MARGIN

BACKGROUND OF THE INVENTION

1. Field of Invention

The present invention relates to a method and system for power control by interference prediction with error margin for wireless Internet protocol (IP) networks.

2. Description of Related Art

The future generations of wireless networks must accommodate a growing demand for data packet services. High-speed packet services are necessary for wireless data packet communications, such as Internet protocol (IP), which can provide efficient access to remote networks and servers for telecommuters and to facilitate wireless multimedia services such as voice, audio, still-image and video.

Currently, cellular systems employ frequency reuse techniques whereby multiple cells in a network, known as co-channel cells, use the same set of frequencies. The frequency reuse factor of a cellular system is given by the variable N, where N is the cluster size which describes the number of cells which collectively use the complete set of available frequencies. The cluster size N should be chosen according to the amount of interference a mobile or base station can tolerate while maintaining a sufficient quality of communications. The total capacity of a cellular system is inversely proportional to the frequency reuse factor. Thus, decreasing the frequency reuse factor (i.e., the cluster size N) is essential for improving the capacity of cellular networks.

A major limiting factor in the performance of cellular wireless systems is interference. In particular, while frequency reuse improves capacity, it produces co-channel interference. Co-channel interference cannot be corrected by increasing the transmission power of the transmitter because increasing the transmission power raises the interference in neighboring co-channel cells. To reduce the co-channel interference, the co-channel cells must be physically separated by a minimum distance to provide sufficient isolation.

In order to improve the performance of time-division-multiple-access (TDMA) wireless networks and ensure that each base station and mobile terminal transmits the smallest power necessary to maintain a good quality radio link, power control within a network has become essential. Power control not only helps prolong battery life for the mobile units, but also can dramatically enhance the signal-to-interference-plus-noise ratio (SINR) in the system, and thus its error performance and capacity. Accordingly, dynamic transmission power control has been widely studied and practiced to combat and manage interference in cellular radio networks.

Known power control techniques for wireless networks can be categorized as either signal-based and signal-to-interference-ratio (SIR) based. In signal-based power control algorithms, the transmission power is adjusted based upon a received signal strength, which in turn depends upon the path loss, shadowing and fading of the radio link between the transmitter and the receiver. In contrast, SIR-based power control adjusts the power according to the ratio of the power level of the signal to the power level of the co-channel interference (possibly including noise). Studies have shown that SIR-based power control out performs signal-based power control, although the former involves a more complex implementation.

A drawback to both of these power control techniques is that they are applicable mainly to circuits switched connections having a relatively long holding time. Accordingly, these methods utilize iterative algorithms that require the re-adjustment of transmission power over the entire duration of a circuit switched connection and implicitly or explicitly, assume a relatively long call duration. However, the nature of the data traffic and packet-switched networks is bursty, which is fundamentally different from that of circuit-switched networks. For example, in TDMA packet-switched networks, time is divided into slots where the slot size is appropriately chosen to support the applications while controlling the protocol overhead to achieve efficient bandwidth usage. Typically, each data message is divided into a number of packets, each of which can be transmitted in one time slot. As in typical IP wireless networks, the message length (in terms of number of the number of packets) varies randomly from message to message.

Due to the bursty nature of the traffic and irregular transmission schedule inherent in packet-switched data networks, the traditional power control techniques, such as the above-described existing signal-based and SIR-based techniques, do not perform well. The above-described iterative power control methods for circuit switched networks are inefficient for packet-switched wireless network. Accordingly, new techniques have been developed to accommodate such bursting packet-switched network traffic. As described in co-pending U.S. patent application Ser. No. 09/273,125 filed on Mar. 19, 1999, one such system uses a Kalman filter to predict interference power and adjust a transmission power to achieve a target SINR performance.

Such a method relies on the fact that typical wireless networks allow multiple contiguous time slots to be used by a base station or mobile terminal for transmitting a message, and therefore a temporal correlation exists of the interference power between successive time slots. The temporal correlation allows the use of predictive methods, such as Kalman filters, to estimate the interference power in subsequent time slots. Accordingly, a signal path gain parameter and a prediction of the interference power for a future time slot can be used to calculate the power level for the future time slots in order to met a target SINR. However, the interference power prediction can become very inaccurate when each message consists of very few packets, such as where one packet is transmitted in one time slot. In addition, the performance gained by the method reduces when delay is incurred in interference measurements and in the forwarding of power control information from receivers to transmitters. Both of the situations of short messages and control delay are expected in certain wireless IP networks.

Accordingly, there is a significant need for a more efficient power control method for wireless networks.

SUMMARY OF THE INVENTION

The present invention provides a method and system for providing power control in a wireless packet switched network using interference prediction including an error margin. In particular, the method can measure an interference power and a path gain between an intended receiver and transmitter. Based upon the past performance of the network, a future interference value may be predicted by using a prediction algorithm, such as a Kalman filter. Furthermore, based upon the prior accuracy of the interference prediction algorithm, the method can also estimate an error margin for the predicted interference values. Finally, a transmission power for the transmitter can be calculated using the predicted interference power, the estimated error margin for the predicted interference power, the path gain, and the target SINR. Since the effects of short message and control delay have been reflected by the error margin, the enhanced power control method with such an error margin provides accurate interference power prediction, and thus yields a performance gain.

BRIEF DESCRIPTION OF THE DRAWINGS

The invention is described in detail with regards to the following Figures, in which like elements are referred to with like numerals, and in which.

DETAILED DESCRIPTION OF PREFERRED EMBODIMENTS

Figure 1:
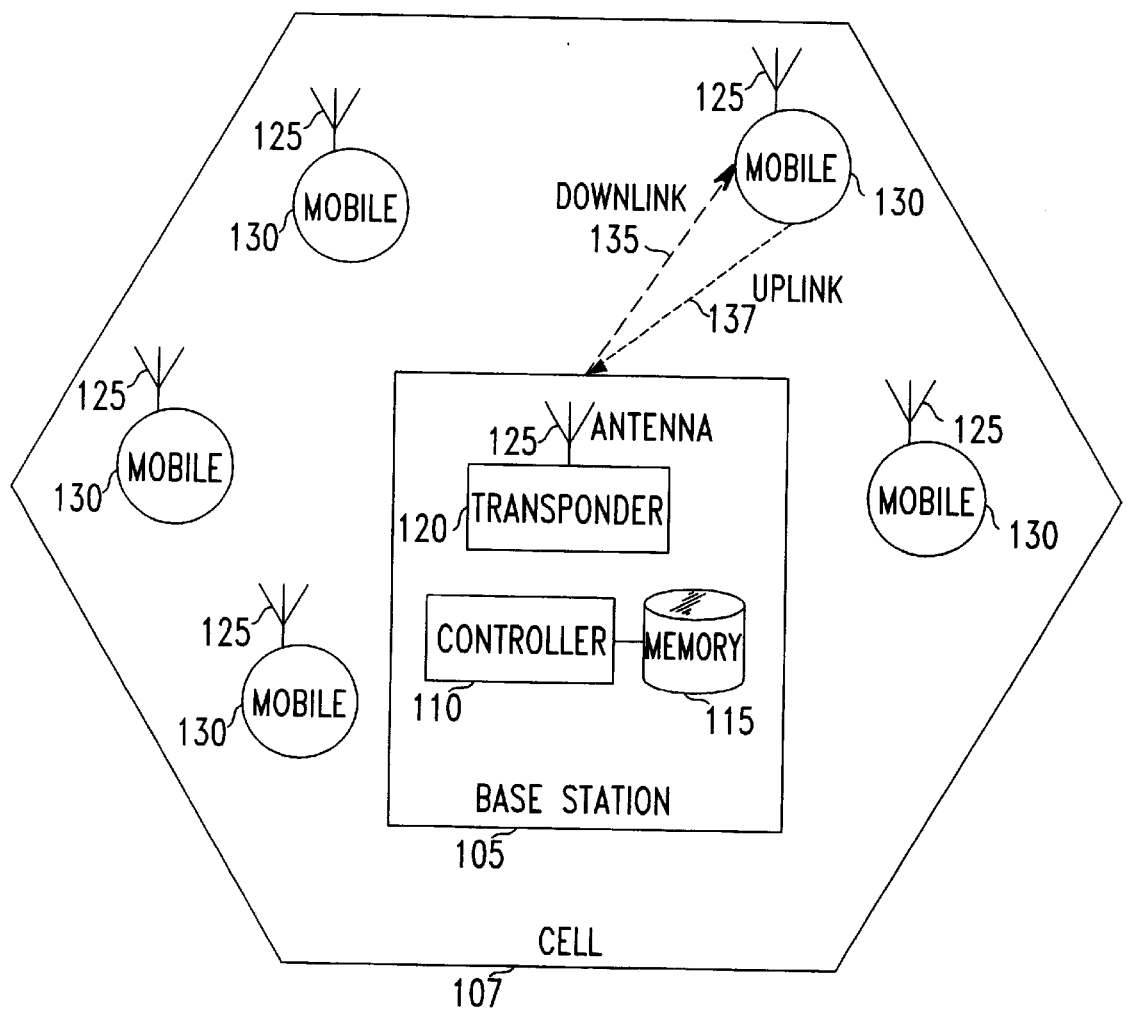
FIG. 1 is a block diagram depicting one cell of a wireless communication network in accordance with the present invention.

FIG. 1 is an exemplary block diagram depicting one cell 107 of a wireless cellular communication network. A base station 105 operates within the cell 107. The base station 105 contains a controller 110, a memory 115, a transponder 120, and an antenna 125. Numerous mobile terminals 130 located within the cell 107 communicate with the base station 105 via the antenna 125, uplink channel 137 and a downlink channel 135.

For the purposes of this application, a number of environmental and system conditions can be assumed. In particular, the uplink channel 137 and the downlink channel 135 are each subject to attenuation due to path gain (effectively attenuation) between the base station 105 and the mobile terminals 130. Effectively, the path gain is the sum of the path loss and the shadow fading for the radio link.

Furthermore, a medium-access control (MAC) protocol is used within the cell 107, which allows at most one mobile terminal 130 in each cell 107 to transmit at a time. That is, no data contention occurs within the same cell 107. Therefore, only one mobile terminal 130 communicates with the base station 105 in a given time slot. Due to the large volume of data involved, the base station 105 typically can not exchange control and scheduling information with another base station 105 operating in a different cell 107. Finally, the interference power for a particular time slot can be measured at the base station 105 and mobile terminals 130 but may include noise and errors.

According to one embodiment of the present invention, the interference power can be measured at an intended receiver, and then used as an input to a prediction algorithm to calculate a predicted interference. The predicted interference, along with an error margin calculated using an error estimating algorithm is used to set the power level for a transmitter. In particular, according to one embodiment of the present invention, to perform power control for the uplink channel 137 (i.e., from the mobile terminal 130 to the base station 105), the intended receiver, the base station 105, measures the interference power for a time slot. The controller 110 is adapted to estimate the interference level for a future time slot along with the estimated error margin of that interference and then calculate a power transmission level for the future time slot in order to meet a target signal-interference-noise-ratio (SINR). Upon determination of the power level for the future time slot, the base station 105 can instruct the mobile terminal 130 to transmit at the calculated power level, using the downlink channel 135.

According to one embodiment of the present invention, in order to perform downlink power control (i.e., from the base station 105 to the mobile terminal 130), the intended receiver, the mobile terminal 130, measures the interference power for a time slot. The mobile terminal 130 then transmits the measured interference power to the base station, which then runs a prediction algorithm along with the estimated error margin algorithm to calculate the power level for its own transmission at a future time slot. However, in an alternative embodiment, the mobile terminal 130 runs the prediction algorithm and estimated error margin algorithm itself and then transmits the calculated power level to the base station 105 via uplink channel 137.

Figure 2:
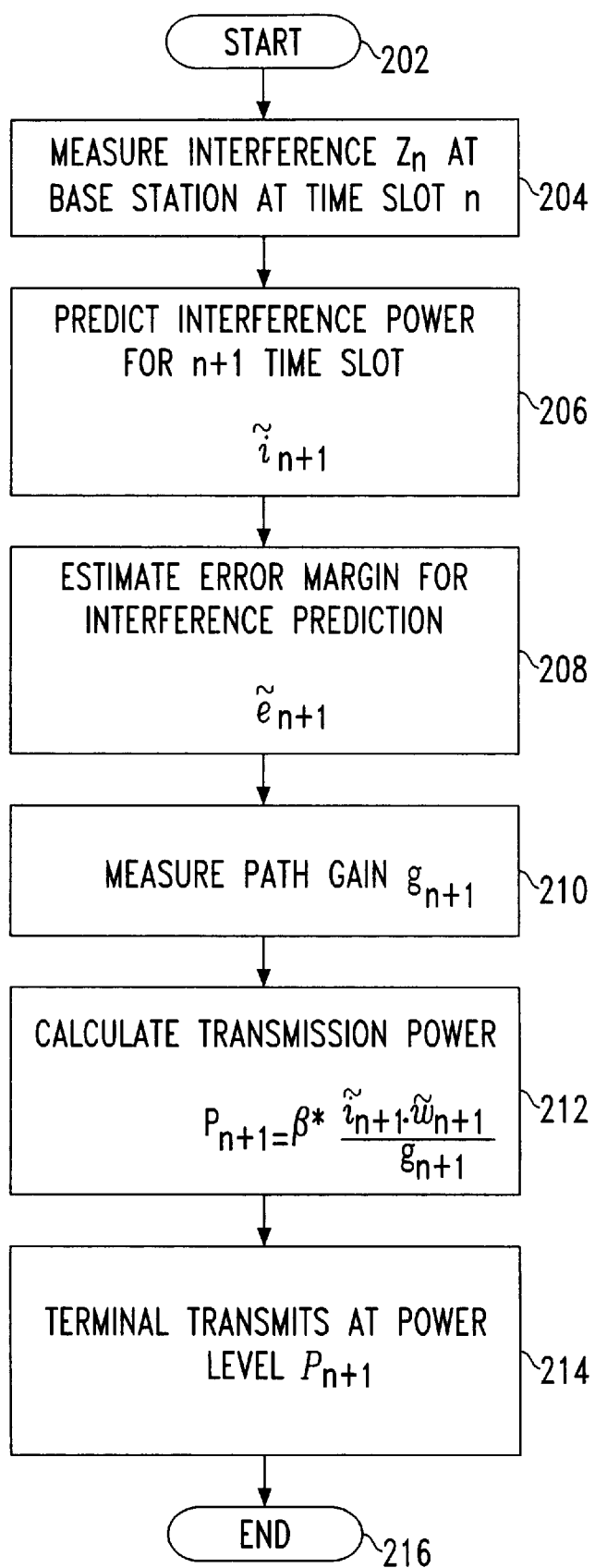
FIG. 2 is a flowchart showing an exemplary process for performing power control for an uplink channel in a wireless network using a predictive method according to the present invention.

FIG. 2 is an exemplary flowchart describing a method of transmission power control with an error margin for an uplink channel. According to one embodiment of the invention, a measurement of the interference power of an intended receiver is taken at a time slot n to set the power for a consecutive time slot n+1. In alternative embodiments, any number of time slots may exist between the time slot n in which a measurement is taken and a future time slot n+x in which the transmission power level is adjusted, where x is the interval size in time slots. Furthermore, the power control algorithm is run for every time slot n. However, this is not intended to limit the scope of the present invention, and in alternative embodiments the power control and error margin algorithms can be performed less frequently. For example, in alternative embodiments a fixed power level transmission can be used over the length of an entire message. This alternative approach is suitable for using polling schemes, such as the MAC protocol, where the transmission power can be included in the polling message and the polled terminal simply transmits that power level if it has data to send.

In step 202, the process begins at the beginning of time slot n, the algorithm is initiated for the mobile terminal 130 scheduled to transmit in time slot n+1. In step 204, the current interference power $Z_n$ at the base station 105 (the intended receiver) is measured. Typically, the base station 105 would be equipped with an electronic device for measuring the current interference power. Methods for the measurement of interference power in wireless networks are well known. In general, the interference power is equal to the difference between the total power received and the power of the desired signal, where the power of the desired signal can be measured by filtering based upon a set of training symbols for the signal.

In step 206, the interference power for the time slot $\tilde{I}_{n+1}$ (in linear power units) at the intended receiver, the base station 105, is predicted, where the mobile terminal 130 is scheduled to transmit in time slot n+1. The prediction can be implemented at the CPU 110 at the base station 105, which is adapted to run a prediction algorithm. According to a preferred embodiment, the prediction algorithm employed is a Kalman filter as described in detail below with reference to FIG. 4.

In step 208 the process estimates an error margin for $\tilde{e}_{n+1}$ the interference prediction $\tilde{I}_{n+1}$ for time slot n+1. The error margin $\tilde{e}_{n+1}$ can be calculated based on the accuracy of the predicted interference power $\tilde{I}_{n+1}$. For example, an interference prediction error may be calculated for a time slot as the difference between the predicted interference power and the measured interference power. Over time, successive measurements of the interference prediction error can be aggregated into a prediction error distribution.

For instance, let the actual prediction error for time slot n be:

$$E_n = I_n - \tilde{I}_n$$

where $I_n$ and $\tilde{I}_n$ are the measured and predicted interference power in dBm for time slot n, respectively. Let there be M possible intervals of prediction error and the range of the jth interval be from $a_j$ to $a_{j+1}$. For each time slot n and each j=1 to M, compute the following:

$$P_n^j = \begin{cases} \alpha P_{n-1}^j & \text{if } E_n > A_{j+1} \\ \alpha P_{n-1}^j & \text{otherwise} \end{cases}$$

Where $\alpha$ is a properly chosen parameter and we set $P_o^j = 1$ for all j=1 to M initially.

Figure 3:
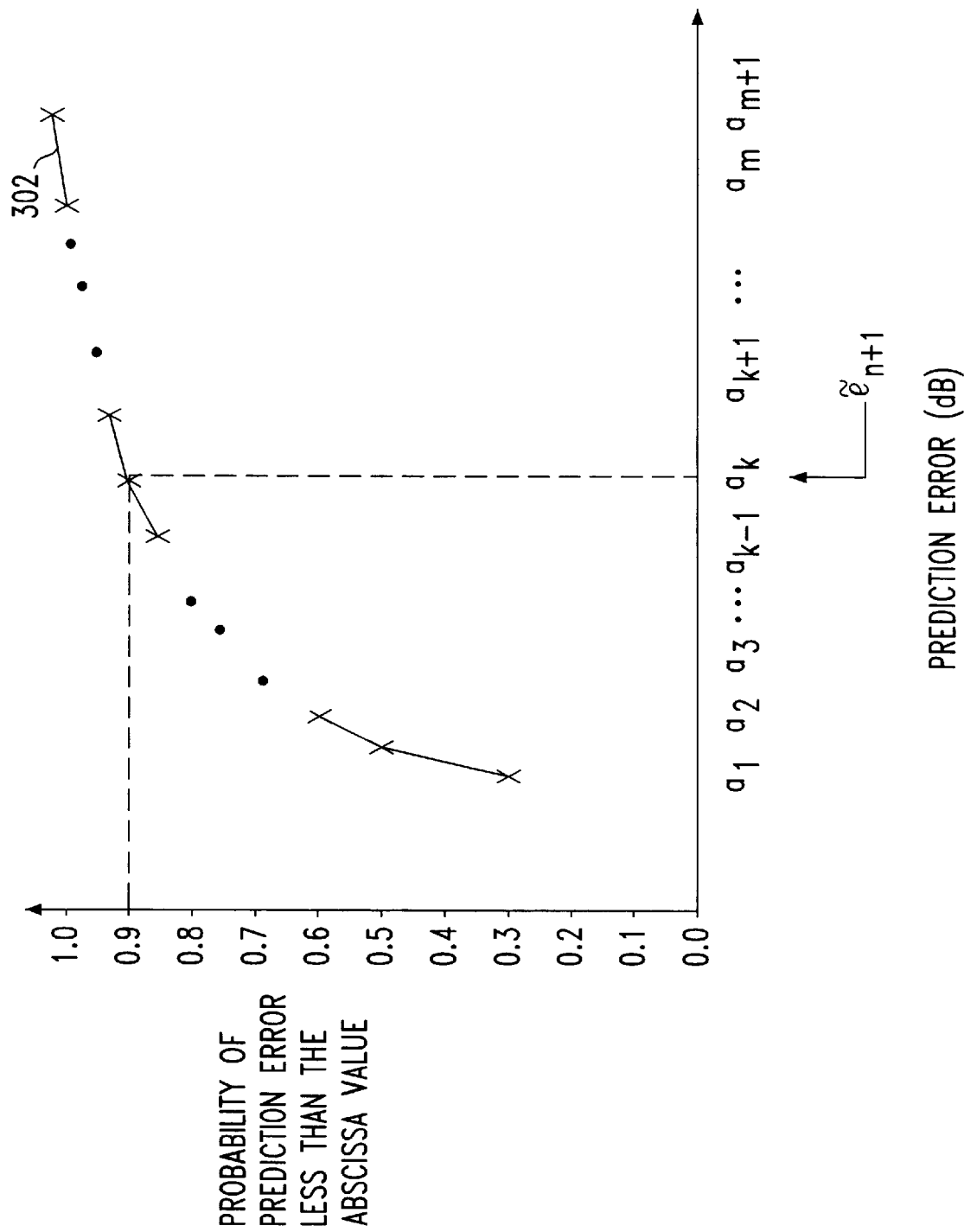
FIG. 3 is an exemplary graph showing prediction error distribution.

FIG. 3 shows a graph of an exemplary prediction error distribution. The Y-axis is the probability of the actual error being less than the value of the amount of error (i.e., the error margin), shown on the X-axis. The plot 302 is the distribution of the interference prediction error. The plot 302 is compiled from many calculations of prior interference prediction errors. The plot 302 can be updated with each newly calculated prediction error to reflect the most current values of the interference prediction error.

By way of example, to achieve a probability of 0.9 that the actual error is less than the predicted interference determined in steps 206, the error margin $\tilde{e}_{n+1}$ for the plot 302 is $a_K$.

In step 210, a path gain parameter $g_{n+1}$ between the mobile terminal 130 and the base station 105 is measured. The methods for determination of the path gain $g_{n+1}$ between a mobile terminal 130 and a base station 105 in a wireless network are well known. In an alternative embodiment, the path gain is not measured for every time slot, but rather is measured once at the beginning of a message transmission and is used for the duration of the message transmission (i.e., for all packets comprising a message).

In step 212, the transmission power for the mobile terminal 130 scheduled to transmit in time slot n+1 is calculated using the equation:

$$P_{n+1} = \beta * \frac{\tilde{I}_{n+1} \tilde{\omega}_{n+1}}{g_{n+1}} \tag{1}$$

where $\beta^*$ is a target SINR, $g_{n+1}$ is the estimated path gain parameter, and $\tilde{I}_{n+1}$ is the predicted interference power for the time slot n+1 and $\omega_{n+1}$ is the linear equivalent of $\tilde{e}_{n+1}$ defined above. The desired result of the relationship in equation (1) is to choose the minimum power necessary to achieve the target SINR, and therefore minimize any interference with others without degrading the local link quality. According to one embodiment of the present invention, different SINR targets ($\beta^*$) can be applied in equation (1) for different mobile terminals 130, depending on the path gain ($g_{n+1}$) to the particular base station 105 and the application requirements. For example, for a poor radio link with large path attenuation and unfavorable shadowing, the link can adapt to the poor quality by reducing its data rate. Thus, a lower SINR target ($\beta^*$) may be used in equation (1) to support decreased data rate for the mobile terminal 130.

In step 214, the base station 105 instructs the mobile station 130 to transmit at the power level $P_{n+1}$ for the time slot n+1 via the down link channel 135.

The embodiment described above describes power control for the uplink 137 channel (i.e., from the mobile terminal 130 to the base station 105). However, the present invention may also be applied for power control to the downlink 135 (i.e., between the base station 105 and the mobile station 130) with departing from the spirit and the scope of the present invention.

Figure 4:
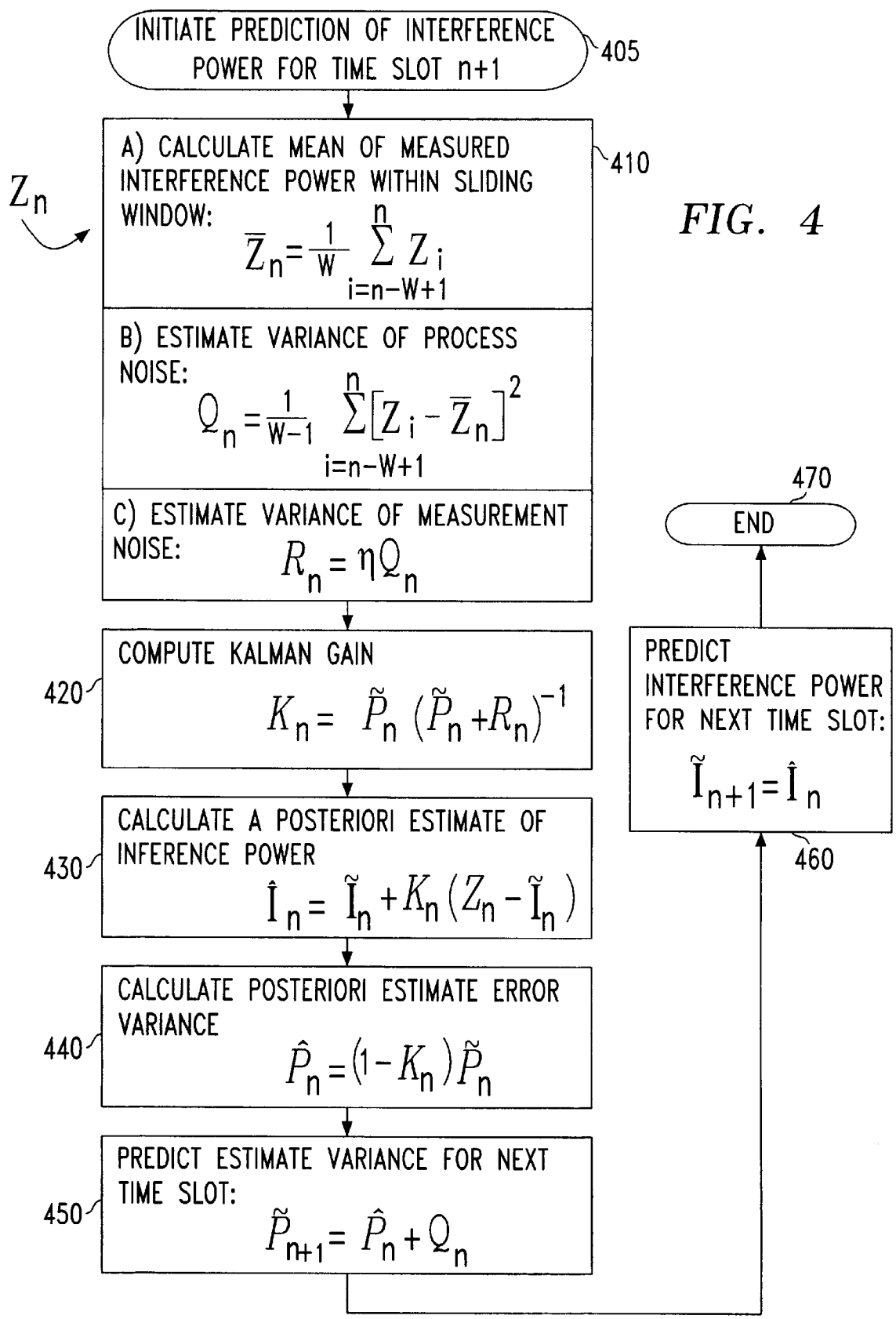
FIG. 4 is a flowchart showing an exemplary process for an implementation of a Kalman filter to predict the interference power for a future time slot according to the present invention.

FIG. 4 is a flowchart describing the process for an exemplary prediction of the interference power for a future time slot using a Kalman filter. Despite the burstiness of packet traffic, because messages typically exceed one packet, interference power is correlated in time in wireless IP networks enabling the employment of a Kalman filter to predict the amount of interference to be received at a base station 105 in the immediate future. $I_n$ is the process state to be estimated by the Kalman filter, where $I_n$ is the actual interference-plus-noise power in dBm received in a time slot n at a give base station. The dynamics of the interference power are described by the equation:

$$I_n = I_{n-1} + F_n \tag{2}$$

where $F_n$, the process noise, represents the fluctuation of interference power for slot n as terminals may start new transmissions and/or adjust their transmission power in the time slot. $Z_n$ is the measured interference power in time slot n as described by the following relationship:

$$Z_n = I_n + \Delta_n \tag{3}$$

where $\Delta_n$ is referred to as the measurement noise.

The algorithm for the prediction of the interference power for the succeeding time slot is initiated in step 405. The measured interference power at time slot n, $Z_n$ (see FIG. 2, step 204) is used as input to the Kalman filter. In order to implement a Kalman filter, knowledge of the covariance structure of the process noise and the measurement error is required. According to one embodiment of the present invention, $Q_n$, the variance of the process noise and $R_n$, the variance of the measurement noise, are estimated using a sliding window of length W based upon stored measurement values $Z_i$. According to one embodiment of the present invention, the last W measurement values, $Z_{n-W+1}$ to $Z_n$ are stored in memory 115. According to one embodiment of the present invention, the sliding window size W is set to be at least several times the average message length so that multiple terminals are likely to have transmitted during the time window, thus capturing the changes of interference power.

In step 410a, the mean measurement value for the last W time slots is calculated using previously stored measurement values $Z_{n-W+1}$ through the current measurement value for time slot n, $Z_n$ as follows:

$$\bar{Z}_n = \frac{1}{W} \sum_{i=n-W+1}^{n} Z_i \quad (4)$$

In step 410b, the variance of the process noise, $Q_n$ is estimated by calculating the variance of the measurement values for the last W time slots as follows:

$$Q_n = \frac{1}{W-1} \sum_{i=n-W+1}^{n} [Z_i - \bar{Z}_n]^2 \quad (5)$$

This estimate of the variance of the process noise, $Q_n$ provides an estimate of the variance of the sum of the process noise and measurement noise because interference power measurements $Z_n$ include the fluctuation of both interference and measurement errors. However, because the standard deviation of the interference power can reach as much as tens of decibels, which greatly exceeds typical measurement errors, estimating $Q_n$ in this manner yields a relatively accurate variance for the process noise $F_n$.

In step 410c, the variance of the measurement noise, $R_n$ is calculated using the relationship:

$$R_n = \eta Q_n \quad (6)$$

where η is a proportionality constant between 0 and 1. The choice of $R_n$ according to equation (6) is reasonable because the measurement noise (error) is likely to be proportional to, but smaller than, the fluctuations of the interference power.

In step 420, the Kalman gain is computed using the following relationship:

$$K_n = \tilde{P}_n (\tilde{P}_n + R_n)^{-1} \quad (7)$$

where $\tilde{P}_n$ is the priori estimate of the measurement error variance.

In step 430, the Kalman gain, $K_n$, is used to obtain an a posteriori estimate of the interference noise using the measurement for the current time slot $Z_n$ as follows:

$$\hat{I}_n = \tilde{I}_n + K_n (Z_n - \tilde{I}_n) \quad (8)$$

In step 440, the a posteriori estimate error variance is computed as follows:

$$\hat{P}_n = (1 - K_n) \tilde{P}_n \quad (9)$$

In step 450, the estimate error variance is predicted for time slot n+1 as follows:

$$\tilde{P}_{n+1} = \hat{P}_n + Q_n \quad (10)$$

Finally, in step 460, the interference power for time slot, n+1, is predicted using the relationship:

$$\tilde{I}_{n+1} = \hat{I}_n \quad (11)$$

Figure 5:
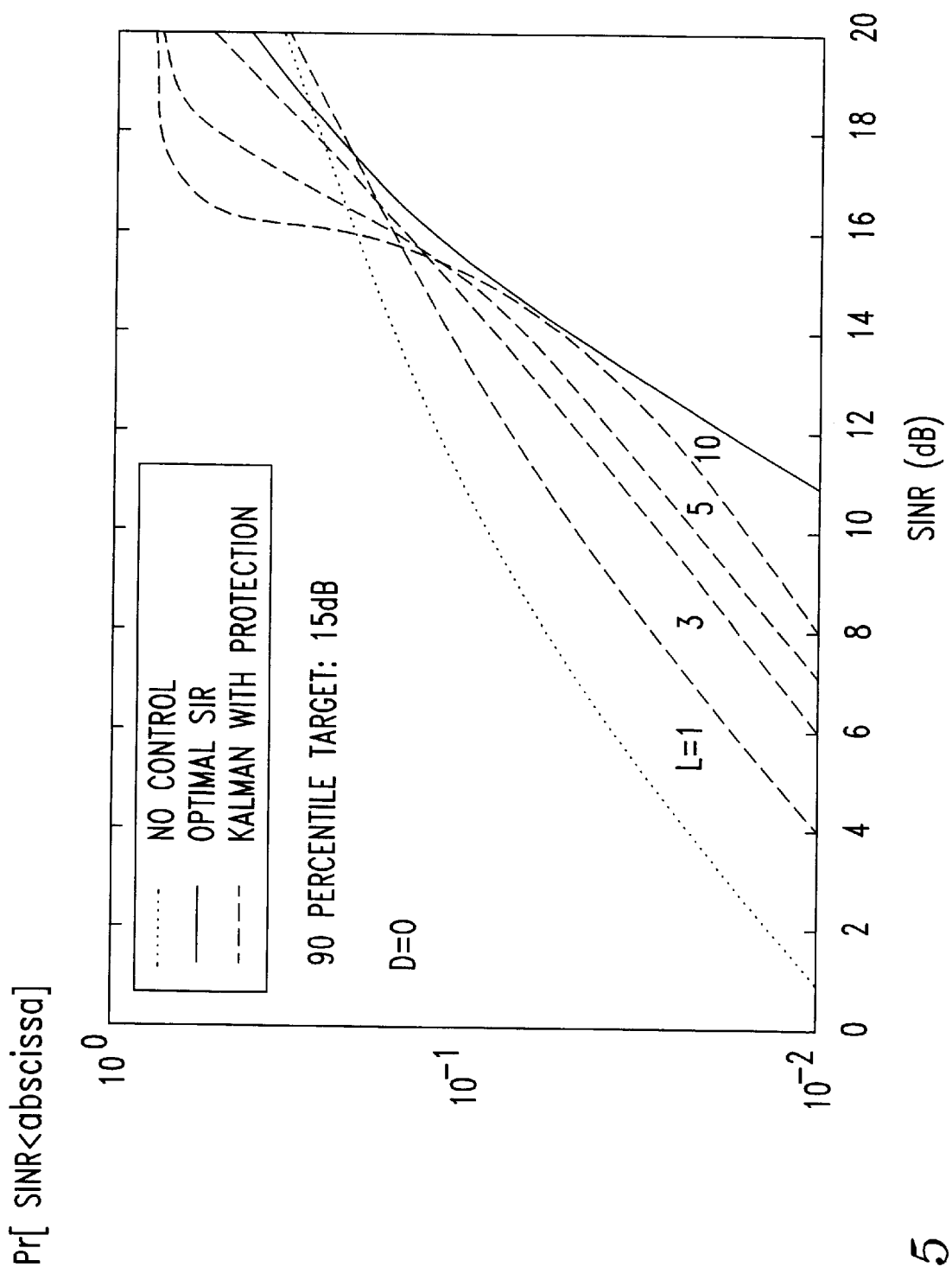
FIG. 5 is a graph of exemplary cumulative probability distribution functions of SINR for the disclosed power control technique having various average message lengths.

FIG. 5 is a graph of various cumulative probability distribution functions comparing the performance of different power control schemes with respect to various average message lengths. The performance of the power control schemes depicted in FIG. 5 are no power control and an embodiment of the Kalman filter method of various messages lengths of 1, 3, 5 and 10 packets. The target SINR, β*, was set at 15 dB. For no power control, transmission power was fixed at 30 dBm (1 Watt).

Results for the optimal power control characteristic curve, shown by the solid line in FIG. 5 were obtained by the method outlined in S. A. Grandhi, R. Vijayan, D. J. Goodman and J. Zander, "Centralized Power Control in Cellular Radio System"IEEE *Trans. on Veh. Tech.*, Vol. 42, No. 4, Nov. 1993, pp. 466–468, incorporated herein by reference in its entirety, based on the SIR without considering the thermal noise. The optimal power control method requires precise knowledge of the path gain for all combinations of mobile terminals 130 and base stations 105 (i.e., the path gain matrix for all transmitting mobile terminals 130 and receiving base stations 105). Using this path gain matrix, an iterative method was executed until convergence to determine the optimal transmission power for each time slot. The transmission power was scaled in each iteration to avoid numerical underflow and overflow. The optimal power control method represents the upper bounds for the actual SINR performance of the system.

Simulations were run using different values for the average message length, L, and the control delay, D. In particular, FIGS. 5 through 8 show that the enhanced power-control method provides a significant performance improvement despite short message length and moderate control delay of several time slots for a system with 4-sector cells and an interleaved frequent assignment of a reuse factor of ⅔. This technique has been proposed in L. Wang and K. K. Leung, "A High-Capacity Cellular System with Improved Sectorization and Interleaved Channel Assignment," *Multiaccess, Mobility and Teletraffic (MMT'98) for Wireless Communications*: Volume 3, Kluwer Academic Publishers, 1998, pp. 43–58 incorporated herein by reference in its entirety.

As shown in FIG. 5, even for the worst case where each message consists of a single packet (i.e., average message length L=1), the 90 and 95 percentile of the SINR by the proposed method are 2.69 and 2.96 dB above those for no power control. In contrast, the original Kalman-filter method, as described in co-pending U.S. patent application Ser. No. 09/273,125, without the error margin yields no SINR gain for L=1. The performance gain for the method further improves as L increases in FIG. 5. Such gain translates into a large improvement in network capacity.

Figure 6:
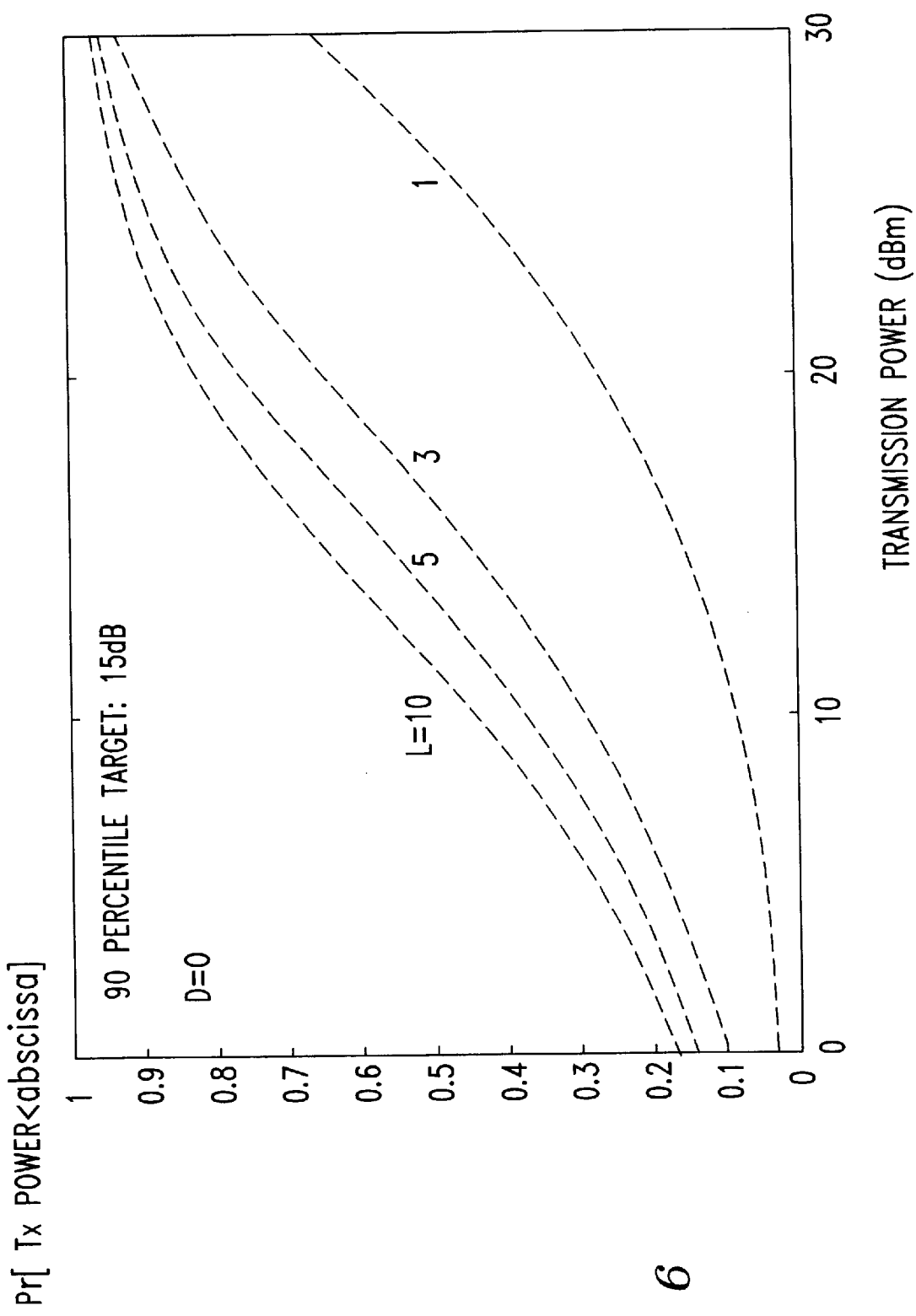
FIG. 6 is a graph of an exemplary cumulative probability distribution function of transmission power for the disclosed power control technique having various average message lengths.

FIG. 6 shows the cumulative distribution function for the transmission power for various values of average message length L, assuming the control delay D being zero. When L is small, the interference prediction becomes inaccurate. As a result, the prediction error is large, thus resulting in a large error margin ($\omega_{n+1}$ in equation 1) and relatively high transmission power. This phenomenon is reflected by the distribution curves in FIG. 6. Nevertheless, the new power-control method controls the transmission power adequately enough to meet the SINR target without causing excessive interference to other transmissions.

Figure 7:
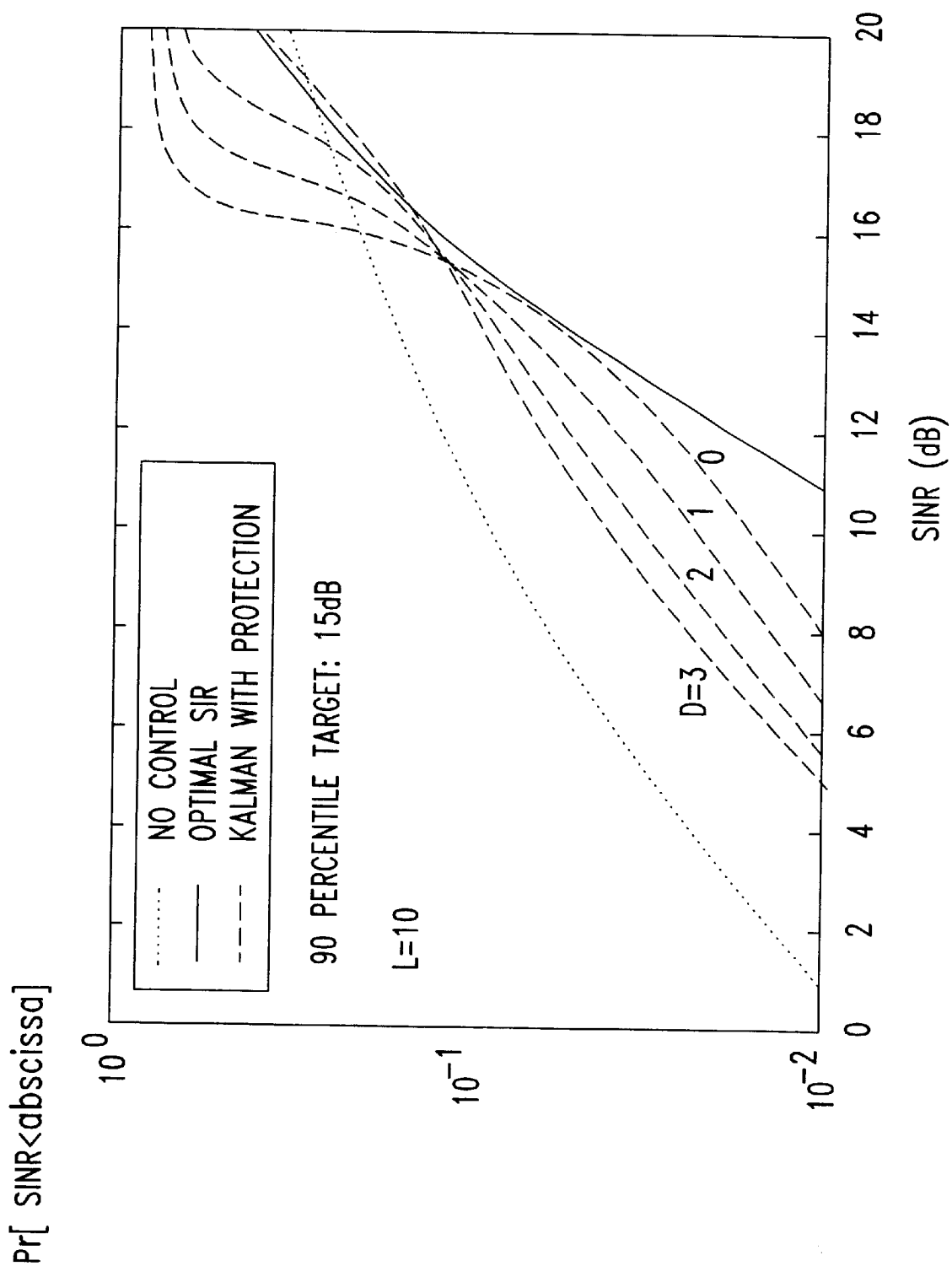
FIG. 7 is a graph of an exemplary cumulative probability distribution function of SINR for the disclosed power control technique having various control delays.
Figure 8:
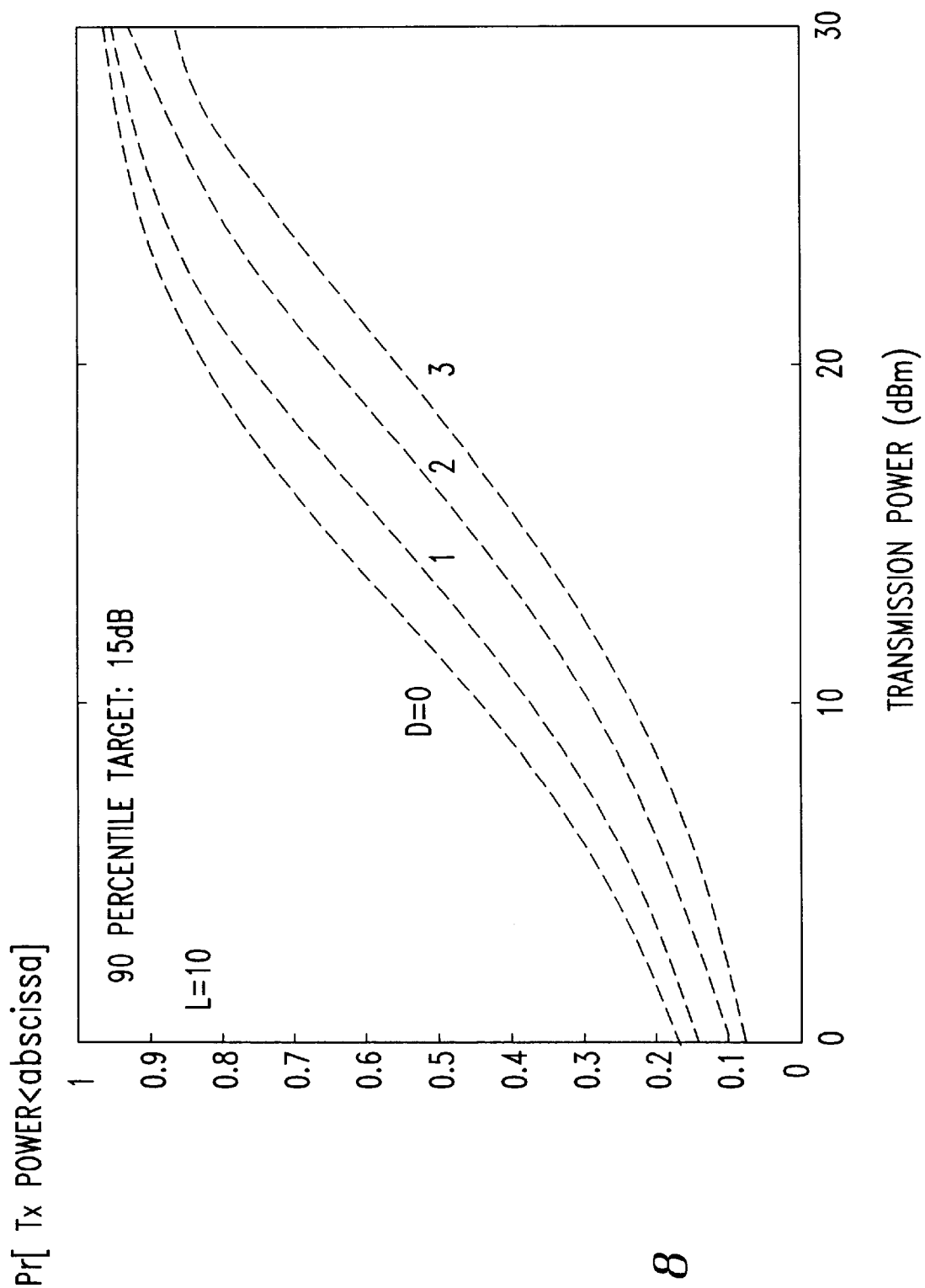
FIG. 8 is a graph of an exemplary cumulative probability distribution function of transmission power for the disclosed power control technique having various control delays.

FIG. 7 depicts the SINR performance gain for L=10 and various control delays of D=0, 1, 2 and 3. Specifically, for the worst case considered with D=3, the 90 and 95 percentile of the SINR by the proposed method are 3.69 and 4.16 dB above those for no power control, which are noticeably higher than the original Kalman-filter power control. Similar to FIG. 6, FIG. 8 shows that the transmission power is increased to provide the needed error protection when D increases.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A method for power control in a wireless network, comprising:
   measuring an interference power value at an intended receiver for a first time slot;
   predicting a second interference power value at the intended receiver for a second time slot using the measured interference power value;
   estimating an error margin for the predicted second interference power value; and
   selecting a transmission power for the second time slot based on the predicted second interference power value and the error margin.

2. The method according to claim 1, wherein the step of estimating the error margin, further includes:
   determining a probability distribution of error between the predicted second interference power value and an actual second interference power value; and
   estimating the error margin based on a desired probability and the probability distribution of error.

3. The method according to claim 1, wherein the step of selecting a transmission power comprises calculating a transmission power to meet a target signal-to-interference-and-noise ratio (SINR).

4. The method according to claim 3, further including the step of determining a path gain parameter between at least one transmitter and a receiver.

5. The method according to claim 4, wherein the step of selecting a transmission power to meet a target SINR includes multiplying the second interference power value by a target signal to interference ratio (SINR) parameter and the error margin, and dividing by the path gain parameter.

6. The method according to claim 4, wherein the path gain parameter is estimated using a prediction algorithm.

7. The method according to claim 6, wherein the prediction algorithm is a Kalman filter.

8. The method according to claim 1, further including the steps of transmitting the selected transmission power to an intended transmitter.

9. The method according to claim 8, wherein the intended transmitter is a base station.

10. The method according to claim 8 wherein the intended transmitter is a mobile terminal.

11. The method according to claim 1 wherein the step of predicting a second interference power value for a second time slot comprises using a Kalman filter to estimate an interference power value for the second time slot using the measured interference power value.

12. Method for power control in a wireless network using a Kalman filter, comprising:
   measuring an interference power value at a receiver for a time slot;
   inputting the measured interference power value to a Kalman filter to predict a second interference power value at the receiver for a second time slot;
   estimating an error margin for the predicted second interference power value; and
   selecting a transmission power for the second time slot in order to meet a target signal to interference and noise ratio (SINR).

13. The method according to claim 12, wherein the step of estimating the error margin, further includes:
   determining a probability distribution of error between the predicted second interference power value and an actual second interference power value; and
   estimating the error margin based on a desired probability and the probability distribution of error.

14. The method according to claim 12, further including the step of determining a path gain parameter between at least one transmitter and a receiver.

15. The method according to claim 12, wherein the step of selecting a transmission power for the second time slot comprises multiplying the second interference power by a target SINR and the error margin, and dividing by the path gain parameter.

16. A wireless packet-switched communication system with power control, comprising:
   at least one cell comprising;
      a base station having at least a transponder and an antenna;
      at least one mobile terminal including at least a transponder and an antenna;
      an electronic device for measuring an interference power value at an intended receiver for a time slot;
   a central processing unit (CPU) adapted to perform the steps of:
      predicting a second interference power value for a second time slot;
      estimating an error margin for the predicted second interference power value; and
      selecting a transmission power for the second time slot based at least the second interference power value and the error margin.

17. The method according to claim 16, wherein the step of estimating the error margin, further includes:
   determining a probability distribution of error between the predicted second interference power value and an actual second interference power value; and
   estimating the error margin based on a desired probability and the probability distribution of error.

18. The wireless communication system according to claim 16 wherein the step of selecting a transmission power comprises calculating a transmission power to meet a target SINR.

19. The wireless communication system of claim 18, further including an electronic device to measure a path gain parameter between the base station and the at least one mobile terminal.

20. The wireless communication system of claim 19, wherein the step of selecting a transmission power to meet a target SINR comprises multiplying the second interface power value by a target SINR parameter and the error margin, and divide by the path gain parameter.

21. The wireless communication system of claim 16, wherein the intended transmitter is the base station.

22. The wireless communication system according to claim 16, wherein the intended transmitter is a mobile terminal.

23. The wireless communication system according to claim 16, wherein the CPU is further adapted to perform this step of transmitting the selected transmission power to an intended transmitter.

* * * * *